Patented Oct. 18, 1927.

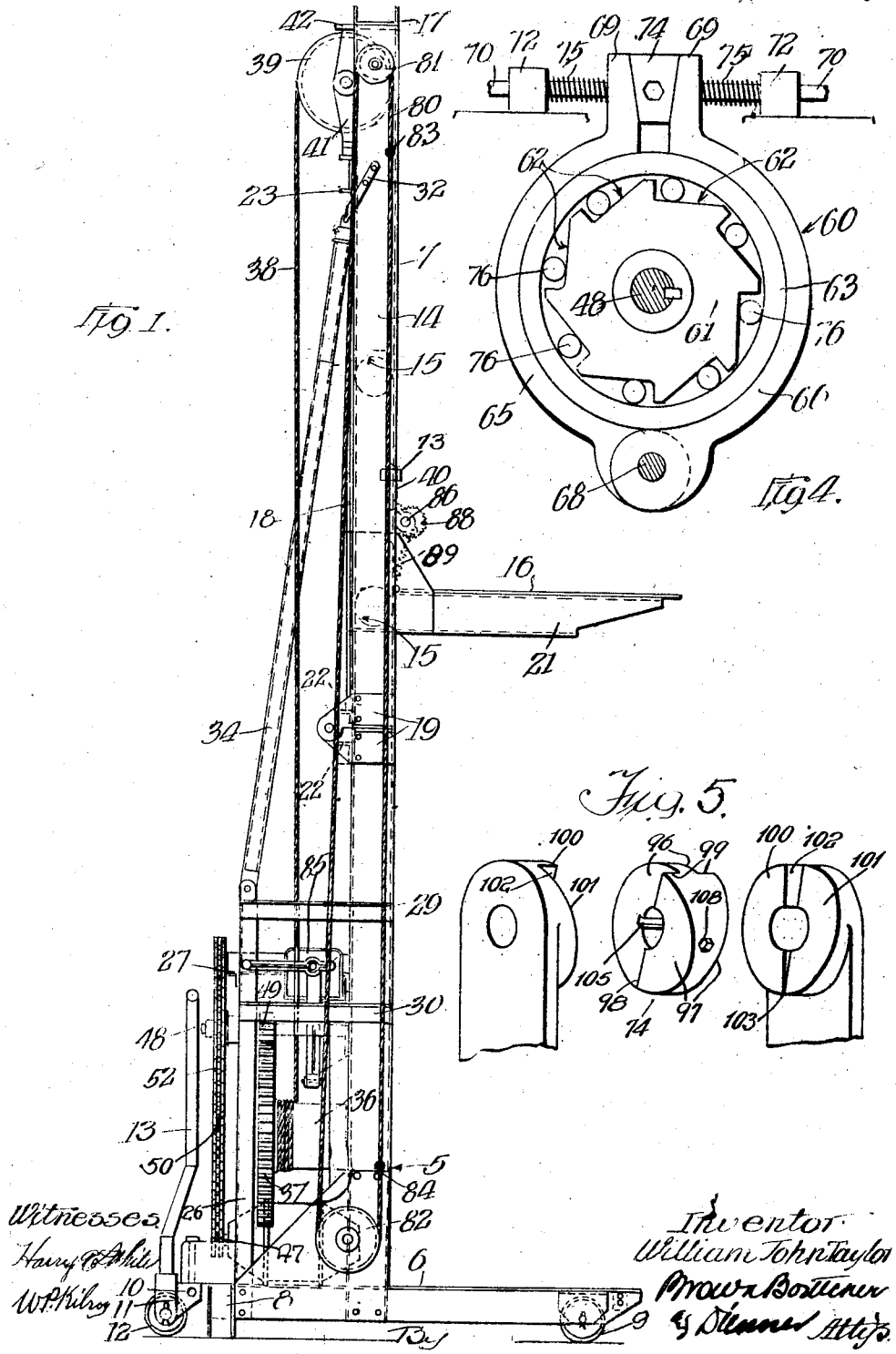

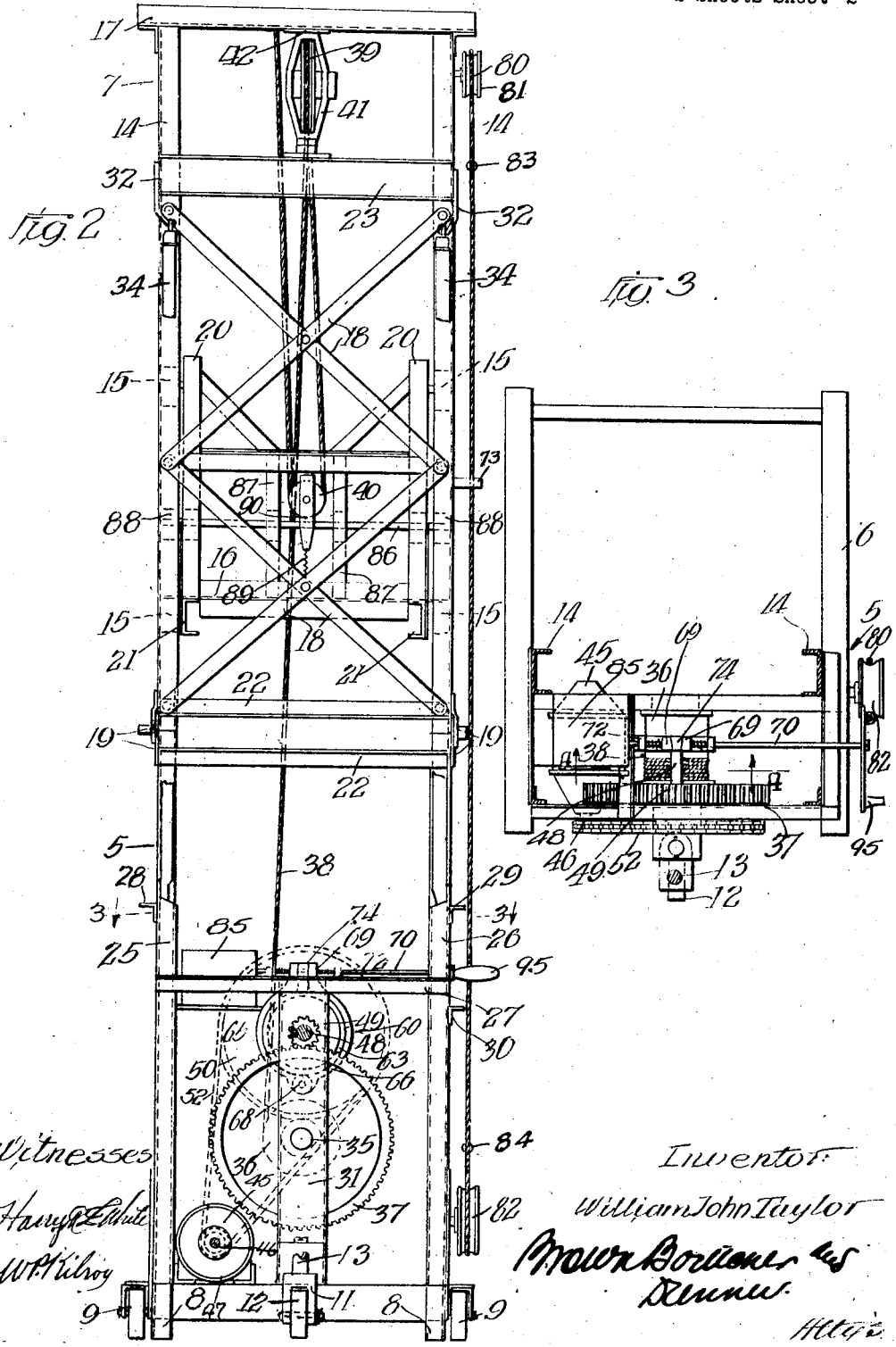

1,645,554

UNITED STATES PATENT OFFICE.

WILLIAM JOHN TAYLOR, OF NORTH CHICAGO, ILLINOIS, ASSIGNOR TO STANDARD CONVEYOR COMPANY, OF ST. PAUL, MINNESOTA, A CORPORATION OF MINNESOTA.

PORTABLE ELEVATOR.

Application filed October 22, 1923. Serial No. 669,938.

This invention relates to improvements in portable elevators, tiering machines and the like.

It is well known that in machines of this sort, brake or arresting motion means is required for preventing downward or backward movement of the carrier against the will of the operator.

An object of my invention is the provision of a brake or motion arresting device which is an improvement in construction and operation over the devices of the prior art. To this end I provide a brake drum about one of the carrier operating or driving shafts, preferably a slow speed shaft and between the shaft and surrounding drum I provide a clutch which permits free rotation of the shaft independently of the drum in one direction and acts upon reverse rotation of the shaft to lock the shaft and drum positively together. The brake element or elements as the case may be, are normally applied to the surrounding drum and hold same positively against rotation in either direction. Locking of the shaft to the drum upon reverse rotation of the shaft, the drum being at all times held against rotation by the co-operating brake, positively locks the carrier against uncontrolled downward movement. Rotation of the shaft independently of the drum permits raising or upward movement of the carrier. Means is provided for releasing the brake from the drum to permit reverse rotation of the shaft and drum together, and thereby lowering of the carrier as rapidly as desired without danger of its getting out of the control of the operator.

The mechanism provided is simple and compact, it operates positively and the cost and number of operating parts is minimized. The brake is normally applied as distinguished from the normally released brake devices of the prior art. The clutch acts to make the locking action between the shaft and drum greater as the tendency toward downward movement of the carrier becomes greater, as distinguished from the holding action of the pawl and ratchet devices of the prior art.

Another object is the provision, at low cost, of a simple, compact and positive machine of this sort having a powerful and compact driving or operating mechanism.

To acquaint those skilled in the art with the manner of constructing and operating the invention, I shall now describe in connection with the accompanying drawings a specific embodiment of the same.

In the drawings:

Figure 1 is a side elevational view of a machine embodying the invention;

Fig. 2 is a front elevational view of the same;

Fig. 3 is a horizontal section on line 3—3 of Figure 2;

Fig. 4 is a detail vertical section on line 4—4 of Figure 3 showing the brake device in elevation; and Fig. 5 is an enlarged perspective view showing the brake releasing cam and cooperating portions of the brake members in detail.

The frame of the embodiment of the invention illustrated is designated generally at 5 and comprises a supporting base 6 and an upright guide frame 7 rising from base 6 between its opposite ends. Base 6 is preferably of angle iron and rectangular formation, and is provided at one end with a pair of supporting feet 8. The opposite end is supported by rollers 9. Journaled between the sides of one end of base 5 at 10 is a wheel carrying yoke or arm 11 and rotatably journaled in yoke 11 is a caster wheel 12. Normally feet 8 rest on the floor with caster wheel 12 raised slightly therefrom. Yoke 11 has a handle 13 by means of which wheel 12 is swung into engagement with the supporting surface. Engagement of wheel 12 with the supporting surface raises feet 8 slightly so that the elevator may be conveniently transported from one place to another on wheels 9 and 12. When handle 13 is again swung into upright position wheel 12 is again raised slightly and feet 8 engage the supporting surface and hold the elevator against accidental movement on rollers 9.

Upright guide frame 7 comprises a pair of standards 14 mounted on the longitudinal members of base 6 between the ends thereof and extending vertically upwardly. Standards 14 are preferably of channel formation arranged with the channel portions facing inwardly to receive and guide rollers 15 of the vertically movable carrier 16, which is mounted for movement up and down one side of guide frame 7. A transverse channel 17 is arranged across and connects the upper ends of standards 14, said standards being braced within their lengths by diagonal struts 18. Standards 14 may be made up in sections hinged or pivotally connected through plates 19 so that the upper section of the guide frame may be folded or swung back and secured, for example, where the vertical clearance is limited. Secured transversely between uprights 14, one above and the other below the hinged joint at plates 19 are a pair of transverse frame members 22, and secured transversely across the windlass side of guide frame 7 below channel 17 is a channel member 23.

Carrier 16 carries and is guided up and down one side of guide frame 7 by rollers 15 and its frame includes upright frame members 20 having frame members 21 projecting horizontally from their lower ends. Frame members 20 travel between guide standards 14 and frame members 21 extend horizontally and carry the platform or supporting surface.

On the other side of guide frame 7 is a generally rectangular frame comprising vertical frame members 25 and 26 and a cross member 27. Connected between the upper ends of frame members 25 and 26 and guide frame 7 are frame members 28, 29 and 30, and vertically between base 6 and frame member 27 is an intermediate frame member 31. Connected at their lower ends to the upper ends of frame members 25 and 26, and at their upper ends through straps 32 to frame member 7 above the hinge joint therein are a pair of truss or brace rods 34.

Journaled at one end in frame member 31 and at its opposite end in a similar frame member is a drum shaft 35. Shaft 35 carries a winding drum or windlass 36 and also a spur gear 37 of relatively large diameter fixed for rotation with drum 36. A cable, rope, or other suitable, flexible winding element 38 is secured at one end to drum 36 and extends up over a sheave 39 down around a sheave 40 and up to cross channel 17 to which it is secured. Cable 38 may of course, simply extend up over sheave 39 and down to and secured to carrier 16 if desired. Sheave 39 is rotatably journaled in a frame 41 which is in turn rotatably journaled between cross channel 23 and a bracket 42 secured to transverse frame member 17.

While the windlass mechanism may be operated manually or by other power means, in the embodiment shown, said mechanism is driven by an electric motor 45 mounted upon the windlass end of base 5. Motor 45 may be mounted upon the top of the rectangular windlass frame or otherwise as desired. Fixed on motor shaft 46 is a relatively small driving sprocket 47. An intermediate shaft 48 having a relatively small spur pinion 49 meshing with relatively large spur gear 37 also has a relatively large sprocket 50. A driving chain 52 trailed over sprockets 47—50 connects motor 45 and shaft 48 which is in turn connected to shaft 35 through gears 49—37 so that upon starting the motor the winding drum is turned to wind or unwind the cable with an accompanying upward or downward movement of the carrier or platform as well understood in the art.

Where a motor is employed as shown, a cable or other continuous flexible controlling element 80 is provided vertically along one side of guide frame 7. Cable 80 is trained over sheaves 81 and 82, and is actuated in one direction by engagement of an abutment 73 carried by the platform, with a stop or abutment 83 on cable 80 at the upper limit of movement of the carrier and in the opposite direction by engagement of abutment 73 with a stop or abutment 84 on cable 80 at the lower limit of movement of the carrier. The motor is preferably of the reversible type to be run in one direction in raising the carrier and in the opposite direction in lowering same.

Downward movement of the carrier against the will of the operator is prevented by a brake device 60 preferably arranged on low speed shaft 48, although it may, of course, be otherwise disposed. Brake 60 comprises a block 61 keyed on shaft 48 and provided with inclined peripheral faces 62. A drum 63 surrounds block 61 and co-operable with the outer surface of drum 63 is a brake band comprising segments 65—66 pivoted at their lower ends on a common pin 68 and terminating at their upper ends in spaced radial lugs 69. The inner drum engaging brake surfaces of segments 65—66 may be suitably lined or faced.

A shaft extending at its inner end into a controller box 85 for motor 45 where a motor is employed extends loosely through lugs 69 and is provided at its outer end with a controller handle 95. Controller box 85 is preferably carried by the windlass frame. Handle 95 is disposed in the path of actuation of and is connected directly to cable 80 to be turned by actuation of cable 80 to stop the motor automatically when the carrier reaches the upper and lower limits of its movement.

Mounted on shaft 70 between lugs 69 is a cam 74 having low flat semi-circular surfaces 96 and cam surfaces 97 inclined from points 98 to radial shoulders 99. The inner face of each of the lugs 69 has a high flat semi-circular surface 100 complementing low flat surfaces 96 of cam 74 and a cam surface 101 inclined from radial shoulder 102 to point 103 and complementing cam surfaces 97. In the normal applied condition of the brake, flat high surfaces 100 fit snugly against low flat surfaces 96 with the low points of cam surfaces 97 against the high points of cam surfaces 101 and shoulders 102 in engagement with shoulders 99. With the parts in this position, rotation of cam 74 in a clockwise direction (Fig. 5) moves the high point of cam surfaces 97 over cam surfaces 101 toward the high point thereof with a resulting spreading of segmental brake members 65—66 from braking engagement with drum 63.

A pair of coiled springs 75 interposed between lugs 69 and blocks or stops 72 normally force brake members 65—66 into braking engagement with drum 63 and hold said drum against rotation in either direction. Between inclined peripheral faces 62 and the internal surface of drum 63 are ball members 76 which ball members permit rotation of shaft 48 free of drum 63 in a clockwise direction (Fig. 1). This permits raising or upward movement of the carrier. Reverse rotation of shaft 48 and block 61 carried thereby causes ball members 76 to bind between inclined faces 62, and the internal surface of drum 63, thereby locking shaft 48 and drum 63 securely together, rotation of drum 63 being normally prevented. Downward movement of the carrier is prevented by the locking of shaft 48 to drum 63 through ball members 76 and thereby against rotation in this manner. The greater the tendency toward downward movement of the carrier, the greater the locking action between shaft 48 and drum 63, as distinguished from the holding pawls of the prior art.

Cam 74 is preferably provided with a keyway 105 by which it is keyed on shaft 70 so that when the carrier reaches its upper limit of movement the motor is automatically stopped and then in turning the controller handle further in the direction in which it is turned to automatically stop the motor at the upper limit of movement of the carrier, the motor is started in the reverse direction to lower the carrier and the brake is at the same time automatically released to permit lowering of the carrier. As the carrier reaches the lower limit of its movement automatic rotation of shaft 70 in the opposite direction automatically stops rotation of the motor shaft and in subsequent turning of the control handle to start the motor in the direction to raise the carrier, cam 74 is automatically released whereupon springs 75 act to apply the brake so that it will be effective through the upward movement of the carrier. Cam 74 is provided with a key, or handle receiving socket 108 which may be hexagonal as shown. Insertion of a suitable key or handle into said socket permits turning the cam manually to throw the brake members out of engagement or to release the cam and thereby permit engagement of the brake members with the drum. In lowering the platform brake members 65—66 are released and shaft 48 and drum 63 rotate together. Lowering of the carrier as rapidly as desired without danger of its getting out of the control of the operator is thus permitted.

Where cam 74 is keyed or otherwise fixed on shaft 70 manual rotation of the cam in the downward movement of the carrier may apply the brake and automatically stop the motor. This is particularly advantageous in lowering the carrier as quickly as possible and with a minimum of effort and without danger of it at any time getting out of the control of the operator. Socket 108 is not necessary where cam 74 is fixed on shaft 70 and a controller handle is provided. The brake and motor may be controlled by handle 95. Such a socket or similar means for facilitating manual rotation of the cam is desirable however, where the cam is loose on the shaft or where the motor is omitted as in a manually operated machine.

The sprocket, driving chain and cooperating gear arrangement shown provides an exceedingly compact and powerful drive. As already pointed out, the means for turning the drum may be varied.

To prevent a sudden descent or uncontrolled dropping of platform 16 in the event of breaking of cable 38 or failure of another part of the machine, a safety device is provided. This includes a shaft 86 mounted transversely across and journaled in uprights 20 and 87 of the carrier or platform frame. Opposite ends of shaft 86 carry cams 88 having serrated edges for engagement with uprights 14. A spring 89 connected between an arm or shaft 86 and the frame or supporting surface of platform 16 tends to rotate shaft 86 in a direction to force the serrated edges of cams 88 into engagement with uprights 14. Sheave 40 is journaled in a frame 90 which is connected to shaft 86 as through a suitable arm and normally turns shaft 86 in a direction to hold the serrated peripheries of cams 88 out of engagement with uprights 14. In the event cable 38 breaks the serrated edges of cams 88 are thrown into biting engagement with uprights 14 by spring 89 to provide a check or stop against dropping or fall of the carrier. The serrated edges of the cams are preferably arranged so that the biting engagement with uprights 14 is increased by the weight of the carrier when released.

I claim:

1. In combination, a brake drum, brake means for holding the drum against rotation, said brake means having projecting lugs with opposed cam surfaces, a shaft extending loosely through said projecting lugs, and a brake controlling cam mounted on said shaft between the projecting lugs and having cam surfaces cooperable with the cam surfaces of said lugs.

2. In combination, a drum, brake means for holding the drum against rotation, said brake means comprising a pair of pivoted segmental brake members cooperable with the drum and having projecting lugs, a shaft extending freely through said lugs, means on said shaft between said lugs and cooperable with said lugs for releasing said brake members from cooperation with said drum, and coiled springs surrounding and mounted upon said shaft and normally urging said brake members into cooperation with said drum.

3. In combination, a drum, brake means for holding the drum against rotation, said brake means comprising a pair of pivoted segmental brake members cooperable with the drum and having projecting lugs, means on said shaft between said lugs and cooperable with said lugs for releasing said brake members from cooperation with said drum, a pair of stops one adjacent each said projecting lug and a pair of coiled springs surrounding and mounted upon said shaft with one of said springs interposed between each projecting lug and the adjacent stop, said springs normally urging said brake members into cooperation with said drum.

In witness whereof, I hereunto subscribe my name this 19th day of October, 1923.

WILLIAM JOHN TAYLOR.